(No Model.)
L. H. NORTH.
DECOY DUCK.
No. 243,954. Patented July 5, 1881.
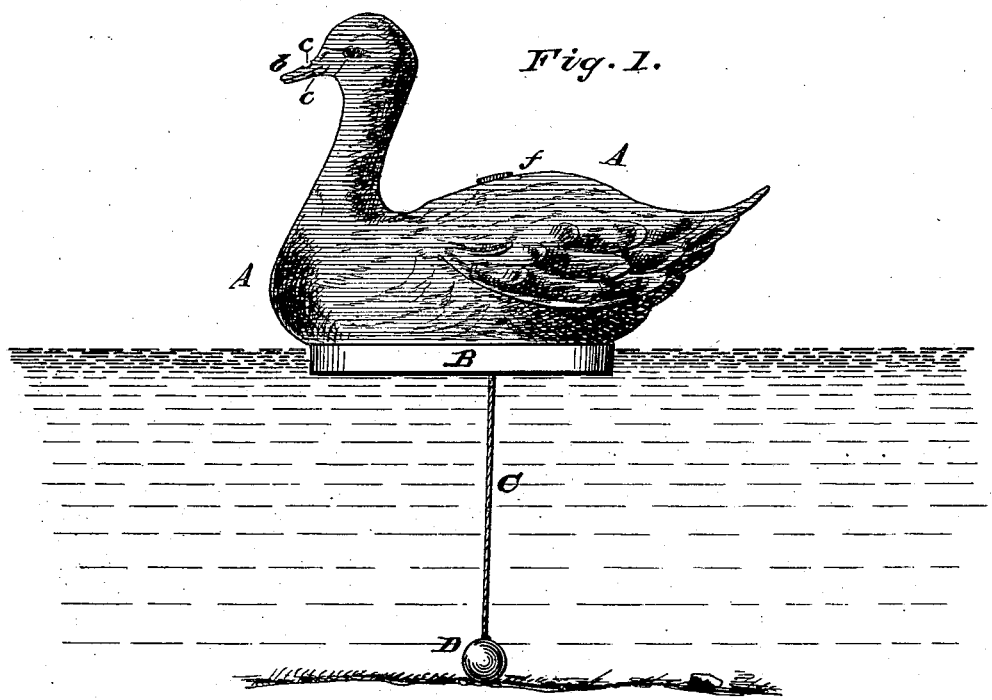
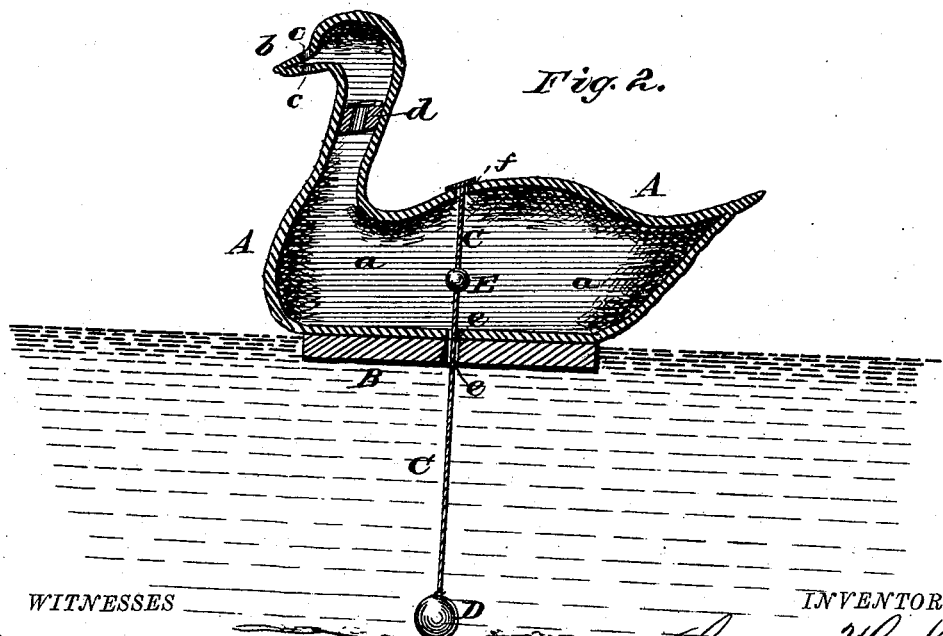
WITNESSES  INVENTOR,

UNITED STATES PATENT OFFICE.

LEONARD H. NORTH, OF CHICAGO, ILLINOIS.

DECOY DUCK.

SPECIFICATION forming part of Letters Patent No. 243,954, dated July 5, 1881.

Application filed April 22, 1881. (No model.)

*To all whom it may concern:*

Be it known that I, LEONARD H. NORTH, of Chicago, in the county of Cook and State of Illinois, have invented certain new and useful Improvements in Combined Decoy Duck and Call; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my decoy duck and call combined, and Fig. 2 is a longitudinal vertical section of the same.

Similar letters of reference indicate corresponding parts in both the figures.

My invention contemplates an improved construction of decoys for ducks and other water-fowl, so that the decoy may be easily carried in the pocket or game-pouch of the sportsman using it. I also combine with the body of the decoy a self-operating call, and thereby greatly increase its usefulness.

In the annexed drawings, A represents the body of the decoy, which is made of india-rubber, or equivalent material, hollow, so as to form an air-chamber, $a$. The exterior is properly painted to imitate a wild duck or other fowl for which the decoy is to be used. The bill (shown at $b$) has an aperture, $c$, and in the hollow neck is placed a reed or duck-call, $d$.

B is a flat piece of cork or light wood, which is affixed to the under side of the hollow rubber body A and serves as a float for the same. Through this float and the bottom of the duck is a hole, $e$, and in the back of the duck, registering with the bottom hole, $e$, is another smaller aperture, $f$.

C is a cord or thin wire having a weight or anchor, D, at its lower end, while its upper end is passed through the apertures $e$ and $f$, the upper end of the cord or wire C being suitably secured on the back of the decoy, after which the upper aperture, $f$, is sealed.

Upon the cord C, within the chamber $a$, is affixed a button, E, so as to be about one inch above the bottom of the chamber. The rubber body A should be of sufficient stiffness to make it stand erect and prevent collapsing, and yet not be too stiff or rigid to prevent its yielding in the operation of the call, which is as follows:

The decoy is anchored, by means of the weighted cord C, at a place which is frequented by the birds, the length of the cord being so adjusted that the weight or anchor at its lower end will touch bottom, keeping the line taut. The motion of the waves will cause the float B with its hollow rubber body A to rock up and down, thus alternately depressing and relaxing the flexible back, so that the air-chamber $a$ will operate in the nature of a bellows, drawing the wind in through the aperture $c$ and call $d$, and, on expelling it (when the body rises on the waves) through the same channel, blowing the call with a sound imitating the "quack" "quack" of the wild birds. The button E limits the play of the line C and prevents the top or back of the decoy from being drawn down too far.

Having thus described my invention, I claim and desire to secure by Letters Patent of the United States—

The combined decoy and call herein shown and described, composed of the hollow elastic body A, having apertures $c$ and $e$, perforated float B, reed or call $d$, and line C, provided with the weight or anchor D and button E, all constructed and combined to operate substantially in the manner and for the purpose set forth.

In testimony that I claim the foregoing as my own I have hereunto affixed my signature in presence of two witnesses.

LEONARD H. NORTH.

Witnesses:
JAMES NELOUS,
AUBRY WILMOT.